United States Patent [19]

Bright et al.

[11] Patent Number: 4,996,756
[45] Date of Patent: Mar. 5, 1991

[54] APPARATUS FOR FITTING SEALING AND TRIMMING STRIPS

[75] Inventors: Robert G. Bright; Heinz J. Hennen, both of Viersen, Fed. Rep. of Germany

[73] Assignee: Draftex Industries Limited, Edinburgh, United Kingdom

[21] Appl. No.: 309,431

[22] Filed: Feb. 10, 1989

[30] Foreign Application Priority Data

Feb. 10, 1988 [GB] United Kingdom ............... 8802992
Aug. 31, 1988 [GB] United Kingdom ............... 8820544
Sep. 2, 1988 [GB] United Kingdom ............... 8820752

[51] Int. Cl.$^5$ .................... B23P 11/00; B21D 39/02
[52] U.S. Cl. .................................. 29/243.58; 72/211
[58] Field of Search ............ 29/243.5, 243.57, 243.58; 72/210, 211

[56] References Cited

U.S. PATENT DOCUMENTS

| | | | |
|---|---|---|---|
| 373,215 | 11/1887 | Baldwin | 72/211 X |
| 1,069,072 | 7/1913 | Noll | 72/210 |
| 1,503,862 | 8/1924 | Sutherland et al. | 29/243.58 |
| 3,528,167 | 9/1970 | Lipp | 29/243.5 X |
| 3,610,191 | 10/1971 | Harris | 29/243.5 |
| 3,662,699 | 5/1972 | Horn et al. | 29/243.5 |
| 4,021,909 | 5/1977 | Bollmer | 29/243.58 X |
| 4,172,313 | 10/1979 | Takahashi | 29/235 |
| 4,311,747 | 1/1982 | Kruschwitz | 428/122 |
| 4,398,334 | 8/1983 | Kovalevich | 29/243.5 |

FOREIGN PATENT DOCUMENTS 1020026 2/1966 United Kingdom .
1588213 4/1981 United Kingdom .
1588214 4/1981 United Kingdom .

Primary Examiner—E. Michael Combs
Attorney, Agent, or Firm—Leydig, Voit & Mayer

[57] ABSTRACT

A tool is described for assembling a length of sealing strip onto a mounting flange around a door opening in a motor vehicle. The strip has a channel-shaped gripping part whose walls are initially splayed apart so that it is an easy fit onto the flange. It carries a tubular sealing part. The tool comprises a roller which engages the outside of the base of the channel of the gripping part and a perpendicularly mounted roller which engages the outside of the tubular sealing part of the strip and, via this sealing part which it compresses, exerts a side force on the corresponding wide wall of the channel of the gripping part. A flange rigid with the roller engaging the gripping part itself engages the opposite side wall of the gripping part. The two rollers may or may not be geared together and are driven via a flexible drive shaft by a motor. The tool thus travels along the length of the sealing strip which is drawn off a coil or other supply. As the tool travels, it closes the splayed apart walls of the gripping part towards each other so as to press them firmly into gripping and sealing contact with the surfaces of the flange, in which position they subsequently hold themselves.

19 Claims, 5 Drawing Sheets

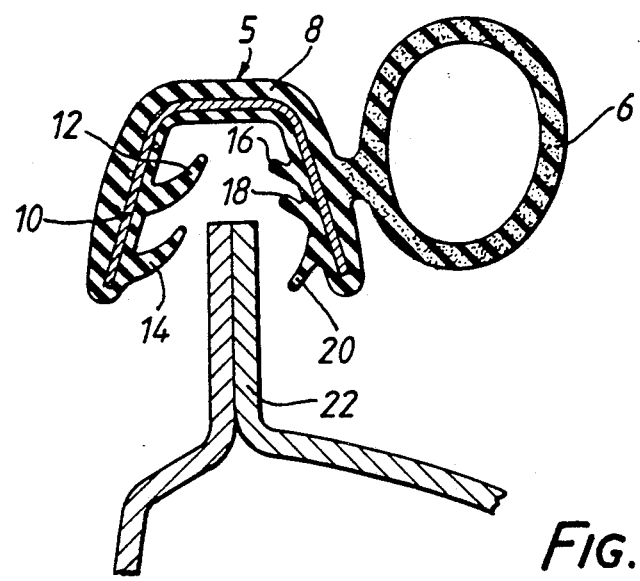
FIG. 1A.
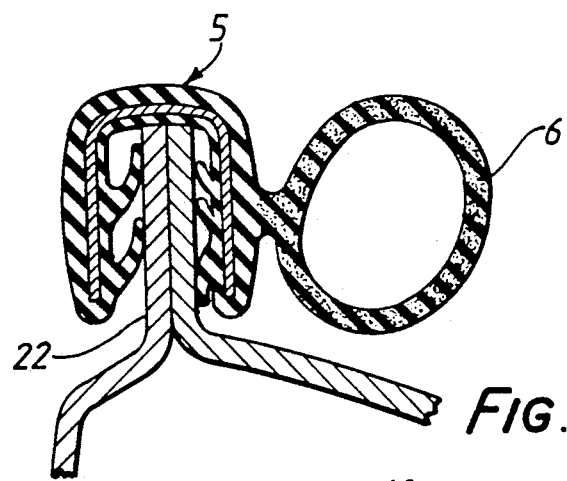
FIG. 1B.
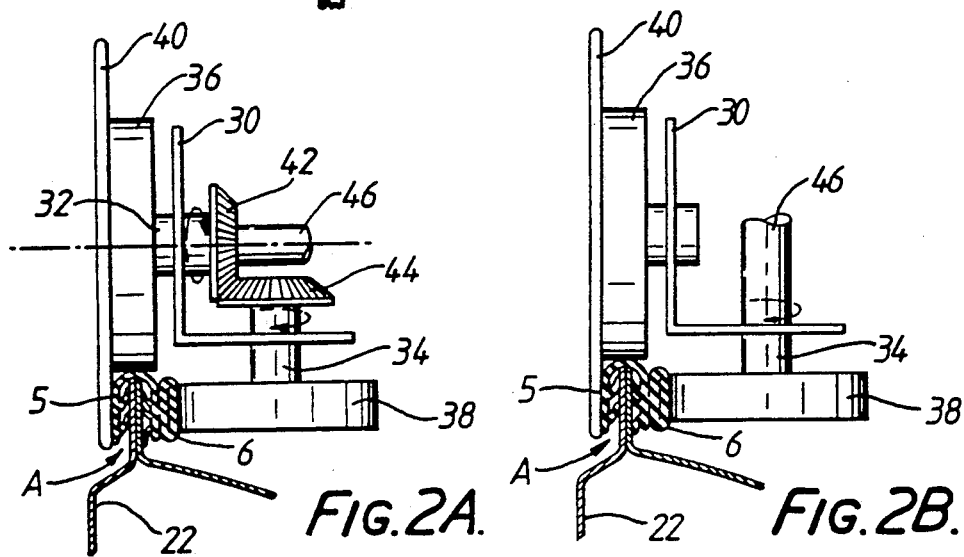
FIG. 2A.
FIG. 2B.

APPARATUS FOR FITTING SEALING AND TRIMMING STRIPS

BACKGROUND OF THE INVENTION

The invention relates to methods and apparatus for fitting sealing or trimming strips. Examples of such sealing or trimming strips are channel-shaped sealing or trimming strips for sealing around openings in motor vehicle bodies. Such openings may be provided with flanges, formed by joined edges of the adjacent bodywork, and the channel-shaped strips are embracingly fitted onto, and grip, the flanges. The flanges are thus covered and protected, and shielded from the occupants of the vehicle. Where such a strip is to act as a sealing strip, an outside wall of the channel may carry a sealing part, such as made of softer material, which is supported by the strip to run around the opening so as to be compressed by and to seal around the periphery of the door of the opening.

Co-pending United Kingdom Patent Application No. 8727690 (Serial No. ) discloses such a sealing or trimming strip. The strip disclosed in this co-pending specification is channel-shaped but initially the side walls of the channel are splayed apart so as to enlarge the mouth of the channel. This eases the initial application of the channel onto the flange because the splayed apart side walls hardly make contact with the flange surfaces during this process. Thereafter, the splayed apart channel walls are pressed towards each other and thus towards the surfaces of the flange, and the strip subsequently retains itself in this new configuration in which it grips firmly against the flange surfaces. Examples of methods and apparatus according to the present invention may be used to press the splayed apart channel walls together.

SUMMARY OF THE INVENTION

According to the invention, there is provided apparatus for installing a channel-shaped sealing or finishing strip on a mounting flange or the like running around an opening closable by a closure member, the sealing strip being generally channel-shaped in cross-section but with the side walls of the channel initially splayed apart to facilitate mounting on the flange, comprising means for applying to the external surfaces of the side walls of the channel, when in position on the flange, pressure which closes the side walls of the channel towards each other.

According to the invention, there is also provided a tool for installing a channel-shaped sealing or finishing strip on a mounting flange or the like running around an opening closable by a closure member, the strip being generally channel-shaped in cross-section but with the side walls of the channel initially splayed apart to facilitate mounting, the tool comprising first and second rollers mounted for rotation about substantially perpendicular axes and having such mutual positioning that the first in use applies pressure to one of the splayed apart side walls of the channel of the strip when mounted on the flange and the second simultaneously applies pressure to the outside of the base of the channel, the second roller carrying support means which applies pressure to the outside of the other splayed apart side wall of the channel, whereby, as the tool is moved along the length of the strip on the flange, the pressure applied by the first roller and the support means move the splayed apart side walls towards each other into a subsequently retained configuration in which the strip embracingly grips the flange.

According to the invention, there is further provided a tool for installing a channel-shaped sealing or finishing strip on a mounting flange or the like running around an opening closable by a closure member, the strip being generally channel-shaped in cross-section but with the side walls of the channel initially splayed apart to facilitate mounting, comprising a pair of rollers mounted for rotation about parallel axes and with their peripheries spaced apart by such predetermined distance as to enable them to apply pressure to the splayed apart side walls of the channel of the strip when the latter is mounted on the flange, so as to close the splayed apart side walls towards each other as the tool moves along the length of the strip on the flange, whereby the side walls move into a subsequently retained configuration in which they embracingly grip the flange.

According to the invention, there is yet further provided apparatus for installing a channel-shaped sealing or finishing strip on a mounting flange or the like, the strip having a generally channel-shaped cross-section but with the side walls of the channel initially spayed apart to facilitate mounting on the flange, comprising means for applying to the external surfaces of the side walls of the channel, when in position on the flange, force which closes the side walls of the channel towards each other, the force-applying means comprising first and second rollers mounted to be rotatable about parallel axes which are spaced apart by an adjustable distance and which respectively engage the said external surfaces, adjusting means for adjusting the said adjustable distance, and drive means for driving the rollers in opposite directions.

DESCRIPTION OF THE DRAWINGS

Tools embodying the invention, for use in fitting a channel-shaped sealing or trimming strip onto a mounting flange, will now be described, by way of example only, with reference to the accompanying diagrammatic drawings in which:

FIGS. 1A and 1B illustrate a channel-shaped sealing and trimming strip of the type disclosed in the above-mentioned co-pending United Kingdom Patent Application No. 8727690, FIG. 1A showing the strip being offered up to the flange and FIG. 1B showing the strip as finally installed on the flange;

FIG. 2A illustrates a tool according to the present invention for use in installing the strip of FIGS. 1A and 1B onto the flange;

FIG. 2B corresponds to FIG. 2A but shows a modified form of the tool;

DESCRIPTION OF PREFERRED EMBODIMENTS

Figure 3:
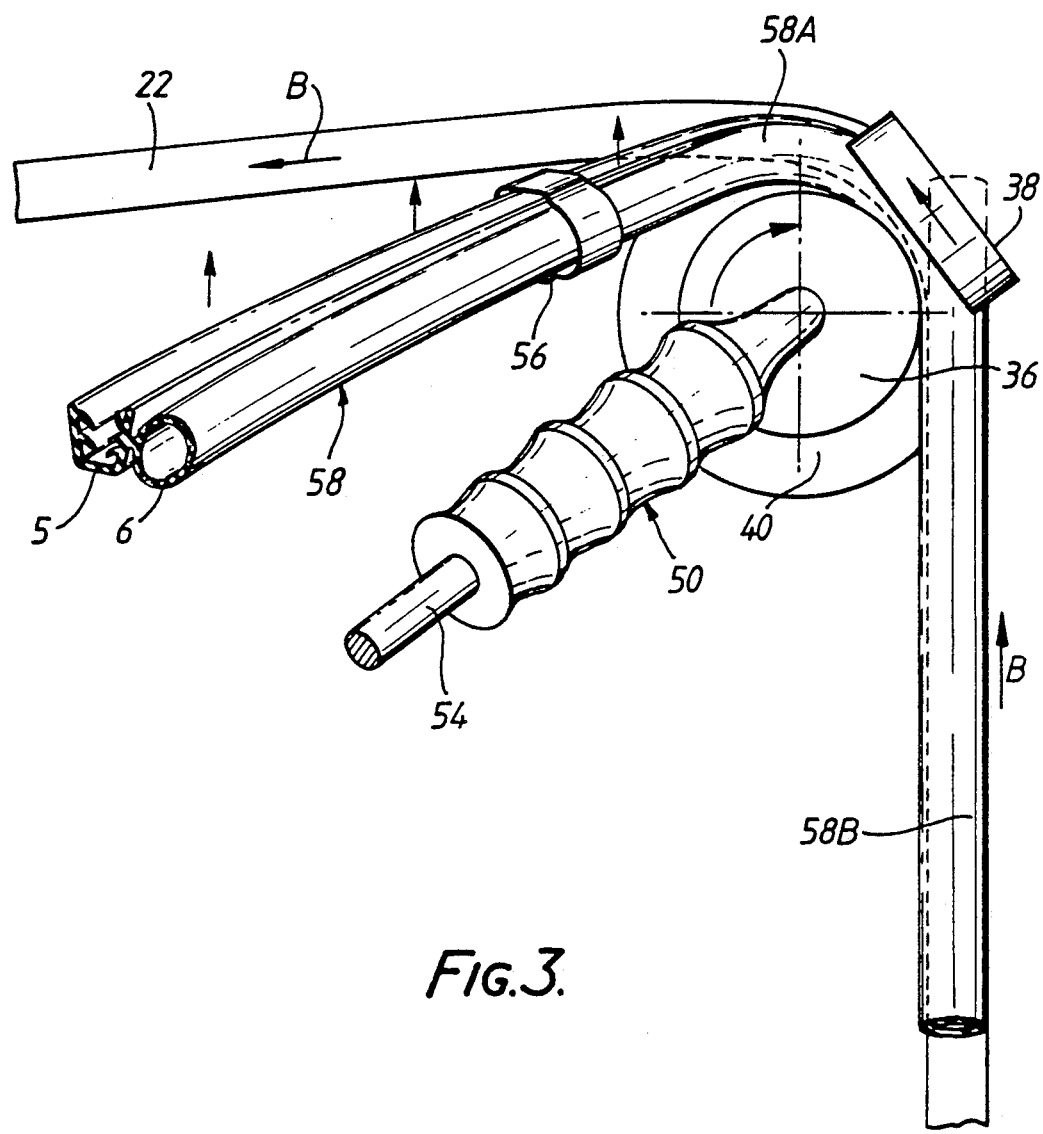
FIG. 3 is a diagrammatic partially perspective view showing the tools of FIGS. 2A and 2B in use.

As shown in FIGS. 1A and 1B, the sealing strip comprises a generally channel-shaped gripping part 5 and a tubular sealing part 6. The part 5 comprises extruded plastics or rubber material 8 in which is completely embedded a metal carrier 10. The gripping part 5 may conveniently be manufactured using a cross-head extruder. The extrusion process is arranged to form lips 12,14,16,18 and 20. As shown in FIG. 1A, in the strip as manufactured the side walls of the channel are splayed outwards so as to enlarge the width of the mouth of the channel.

The tubular sealing part 6 is made of soft flexible material such as rubber. It may be manufactured separately and then secured to one outside wall of the gripping part by means of adhesive or the like. Instead, however, it can be extruded integrally with the material 8. In use, the sealing strip is to be mounted on a flange 22 which runs around a door or similar opening on a motor vehicle body, this flange being the flange formed by the welded joint between the edges of the body panels which meet there. As shown in FIG. 1A, the enlarged mouth of the channel is such that the gripping part 5 can very easily be placed onto the flange and is clearly a loose fit, being hardly in contact with the side surfaces of the flange at all.

In order for the gripping part 5 to grip onto the flange 22, therefore, the splayed apart side walls of the channel have to be forced towards each other so as to become substantially parallel and to assume the configuration shown in FIG. 1B where the lips 12–20 are firmly in good frictional and sealing contact with the side surfaces of the flange. Although the metal carrier 10 has good resilience and helps to ensure that the gripping part 5, when installed on the flange as shown in FIG. 1B, maintains its grip on the flange, it is found that, after the process (to be described in more detail below) by which the side walls of the channel are pressed towards each other, the carrier thereafter maintains a corresponding configuration and does not have a tendency to re-assume the splayed apart configuration.

For a fuller description of the sealing strip shown in FIGS. 1A and 1B, reference is made to the above-mentioned co-pending application.

The methods and tools now to be described are for use in converting the gripping part 5 from the configuration shown in FIG. 1A to that shown in FIG. 1B.

FIG. 2A illustrates in diagrammatic form a tool for use in installing the sealing strip of FIGS. 1A and 1B onto the flange 22. The tool comprises an L-shaped frame 30 which rotatably supports shafts 32 and 34 which are respectively rigid with rollers 36 and 38 whose axes of rotation are thus at right angles to each other. As illustrated in FIG. 2A, the tool is positioned in use so that the periphery of roller 36 bears on the inverted base of the channel of the gripping part 5, whereas the periphery of roller 38 bears on one side wall of the channel of the gripping part 5 through the intermediary of the sealing part 6, as shown in FIG. 2A, this has the effect that the sealing part 6 is completely flattened.

For supporting the opposite side wall of the channel of the gripping part 5, the roller 36 carries a flange 40 which is sized to make contact with this other side wall.

The shafts 32 and 34 are rigid with respective mutually engaging bevel gears 42 and 44, and shaft 32 is extended at 46. In a manner to be explained, shaft 46 is connected to be rotated via a suitable motor and thus rotates roller 36, roller 38 rotating likewise through the intermediary of the engaging bevel gears.

FIG. 3 illustrates the tool of FIG. 2A in use. In FIG. 3, the frame 3 the bevel gears 42 and 44 and the shafts are omitted for clarity. FIG. 3 illustrates a handle 50 carrying an extension 52 which is attached to and carries the frame 30 (FIG. 2A). A flexible drive shaft 54 runs through the handle 50 and the extension 52 and is connected to the shaft 46 (FIG. 2A). The drive shaft 54 is driven by a suitable motor, not shown.

The tool also carries a seal support 56 which is rigidly attached to the handle 50 or its extension 52 by means omitted to aid clarity.

In use, a length 58 of the sealing strip is fed, such as from a coil or drum not shown, through the support 56. Where it emerges, at 58A, from the support 56, it is placed over the flange 22, the channel of the gripping part 5 being at this time splayed apart so as to be a very easy fit onto the flange. The tool is then brought into position on the flange and the free end of the sealing strip, loosely embracing the flange, is manually forced into the space shown at A in FIG. 2A, between the peripheries of the rollers 38 and 40. The drive motor for the tool is then energised and rotates the rollers 36 and 38 in the directions illustrated in FIG. 3. The rotating rollers, in engagement with the sealing strip, thus drive the tool along the flange in the direction of the arrows B (FIG. 3). During this process, the rollers exert sufficient pressure on the sides and inverted base of the channel of the gripping part 5 as to close the splayed apart channel side walls towards each other into the configuration shown in FIG. 1B. As the tool advances in the direction of the arrows B, more strip 58 is drawn from the supply. FIG. 3 shows how the tool has already passed along the length 58B of the strip, so as to install that length on the flange in the configuration shown in FIG. 1B.

As stated above, the flange 40 carried by the roller 36 supports the opposite side wall of the channel of the gripping part 5, that is the side wall on the inside of the vehicle. There is often little space in this region of the interior of the vehicle because of the proximity of adjacent interior trim and the like, and the flange 40, being thin, can be readily accommodated.

The drive motor for the shaft 54 may be carried in a pack worn by the operator or it may be incorporated into the handle 50 itself. The motor may be an electric motor or powered by compressed air or by any other suitable means. It is in fact possible under certain circumstances for the motor to be dispensed with altogether and for the rollers 36 and 38 to be rotated simply by the operator's action in dragging the tool along the strip on the flange. However, in most circumstances this will involve a substantial effort being applied.

FIG. 2B illustrates in diagrammatic form a modified form of the tool of FIG. 2A. In FIG. 2B, parts corresponding to parts in FIG. 2A are similarly referenced. As will be apparent, the tool of FIG. 2B differs from the tool of FIG. 2A in that the tool of FIG. 2B is arranged so that only the roller 38 is driven via shaft 46. Roller 36 is free-running. The tool of FIG. 2B is used in the same way as the tool of FIG. 2A and as illustrated in FIG. 3. As with the shaft 46 in FIG. 2A, the shaft 46 of FIG. 2B can be rotated via a flexible shaft 54 (see FIG. 3) via a motor not shown.

The tools as illustrated in FIGS. 2A, 2B and 3 have the rollers 36 and 38 exposed. However, they can be enclosed within a housing having apertures through which the sealing strip extends.

The handle 50 and its extension 52 may be angularly movable with respect to the frame 30 or may be rigid with the latter.

In practice, the thickness of the flange 22 may not be constant around the whole of the door opening. The flanges are illustrated in FIGS. 1A and 1B and 2A and 2B as being made up of two thicknesses of metal. However, at certain positions around a door opening there may be more or fewer metal thicknesses, and in any case the thickness of the individual metal sheets may vary. Furthermore, spot welds for joining the separate metal sheets together along the length of the flange will cause local changes in thickness. In order to enable the tool to accommodate such variations in thickness, the rollers are advantageously mounted on the frame 30 (FIGS. 2A or 2B) in such a manner that, for all likely variations in flange thickness, they exert substantially constant pressures on the gripping part 5. This can be achieved by suitable resilient mountings for the rollers.

Figure 4:
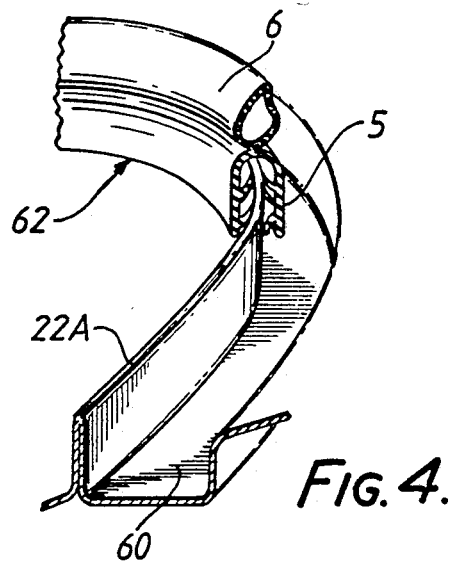
FIG. 4 is a perspective view showing part of the flange around a luggage compartment of a vehicle with a sealing strip mounted thereon.

The flange 22 illustrated in FIGS. 1A, 1B, 2A, 2B and 3 is a flange running around a door opening in a vehicle, the plane of the flange being coincident with or parallel to the general plane of the opening. However, the corresponding flange around the luggage compartment opening on a motor vehicle body is often differently arranged, and this is illustrated in FIG. 4. As shown here, the flange 22A is arranged substantially at right angles to the plane of the opening, running alongside the usual water drainage gulley 60. FIG. 4 shows the sealing strip 62 in position on part of this flange 22A. Because the flange runs at right angles to the plane of the opening, the lid for closing the opening travels towards the inverted base of the gripping part of the strip 62—in contrast to a door for closing a door opening which (as is clear from FIGS. 1A,1B, and 3) closes towards the side of the gripping part. Therefore, the seal 62 has its sealing part 6 carried on the inverted base of the channel of the gripping part.

It will be appreciated that the seal 62 can be manufactured in accordance with the above-mentioned co-pending United Kingdom patent application, that is, with the side walls of its gripping part 5 initially splayed apart so as to be an easy fit onto the flange 22A. Therefore, in order to close the side walls of the gripping part towards each other, in the same manner as described with reference to FIGS. 2A, 2B and 3, a tool of the form shown in FIGS. 2A or 2B could be used. In this case, the roller 36 would exert pressure on the inverted base of the gripping part via the seal 6 (FIG. 4). However, the tools shown in FIGS. 2A and 2B may not be entirely suitable for use with the seal 62 shown in FIG. 4. This is because the configuration of the flange 22A in relation to the plane of the opening means that the flange has to bend through axes perpendicular to the plane of the opening (as is illustrated in FIG. 4). It would thus be difficult for the flange 40 (FIGS. 2A and 2B) to follow around the corresponding bend in the sealing strip. For this reason, therefore, modified forms of tool, as shown in FIGS. 5A and 5B, can be used, in which items corresponding to items in FIGS. 2A and 2B are similarly referenced.

Figure 5A:
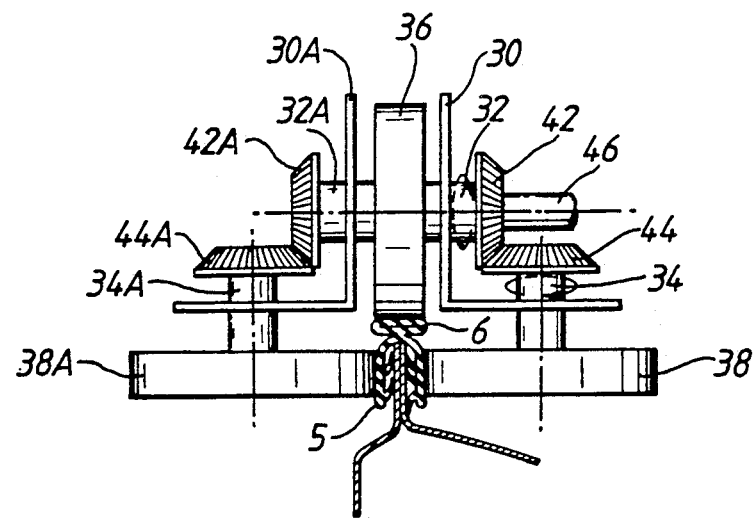
FIG. 5A is an end elevation of another tool embodying the present invention, this tool being for installing the seal shown in FIG. 4, FIG. 5B corresponds to FIG. 5A but shows a modified form of the tool.
Figure 5B:
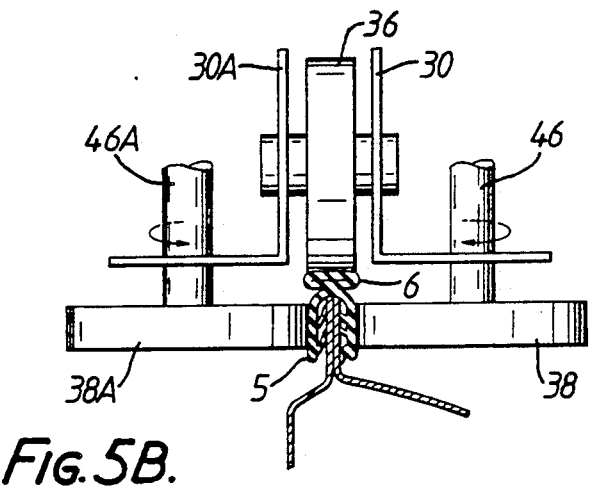

As shown in FIG. 5A, the tool has a second frame, 30A, within which is rotatably carried a shaft 32A being an extension of the shaft 32. In addition, the frame 30A rotatably supports a shaft 34A which is rigid with a further roller 38A. Shafts 32A and 34A carry respective mutually engaging bevel gears 42A and 44A. Roller 38A is positioned to bear against the side wall of the gripping part 5 which is opposite to the side wall against which the roller 38 bears. Roller 36 bears against the inverted base of the channel of the gripping part, via the seal 6. Because of the use of the two rollers 38 and 38A, instead of the flange 40 of the tools of FIGS. 2A and 2B, the tool shown in FIG. 5A can more readily move along the sealing strip 62 where it follows bends in the flange 22A (FIG. 4). The tool is otherwise used in the same manner as described with reference to FIG. 3 and of course acts to close the side walls of the gripping part 5 towards each other, thus causing the gripping part to be held in close gripping and sealing relationship with the flange 22A.

The tool shown in FIG. 5A would be driven via shaft 46 in the same manner as for the tool of FIG. 2A or 2B.

However, it may be advantageous to modify the tool shown in FIG. 5A so as to drive the rollers 38 and 38A via a differential mechanism in order to take account of the fact that they will need to rotate at different speeds when travelling around a bend in the flange.

Instead, however, the tool shown in FIG. 5B can be used. In this tool, rollers 38 and 38A are driven separately by independent shafts 46 and 46A. These are connected via corresponding flexible shafts, through the handle (not shown) of the tool to a differential mechanism driven by and mounted on or adjacent to the drive motor (not shown). In this way, the rollers 38 and 38A can be driven at different speeds as necessary where the tool runs around a curve in the flange. The flexible shafts could be arranged, for example, so as to concentric with one another where they pass through the handle of the tool. The handle could be arranged generally similarly to the handle 50 of FIG. 3.

As shown in FIG. 5B, roller 36 is free running. However, if necessary it could be linked through bevel gears (in a manner illustrated in FIG. 5A) so as to be driven via one, only, of the shafts 46, 46A.

In another modification, a tool for installing the sealing strip 62 onto the flange 22A of FIG. 4 could be generally of the same configuration as shown in FIG. 5A —in the sense that there would be a single drive shaft 46. However, one of the two rollers 38, 38A would be driven through the intermediary of an over-run unit which would permit that roller to run at an increased speed as necessary to cope with bends in the flange.

In a further modification, a tool could be used which would be of the same general configuration as in FIG. 5A, except that the bevel gears 42A and 44A would be omitted so that the roller 38A would be entirely free-running. In this way, it would be able to cope with any speed differential between itself and roller 38 around bends in the flange.

It will be appreciated that the tools described should be as light in weight as possible because they will have to be carried by the fitter. If a differential mechanism is to be used with tools of the form shown in FIGS. 5A and 5B, it may therefore be advantageous for the differential mechanism to be associated with the motor, rather than mounted in the tool itself. The motor, and differential, can be accommodated in a pack worn by the fitter.

If the weight of the tool is significant, however, it can be supported from an overhead rail or the like by means of a spring-loaded flexible support enabling the fitter to grasp it and move it around the opening in the vehicle without having to support any significant part of its weight.

As with the tools of FIGS. 2A and 2B, the rollers in the tools of FIG. 5A and 5B can be mounted so as to exert constant pressure on the relevant parts of the gripping part 5 to take account of variations in flange thickness.

Figure 7:
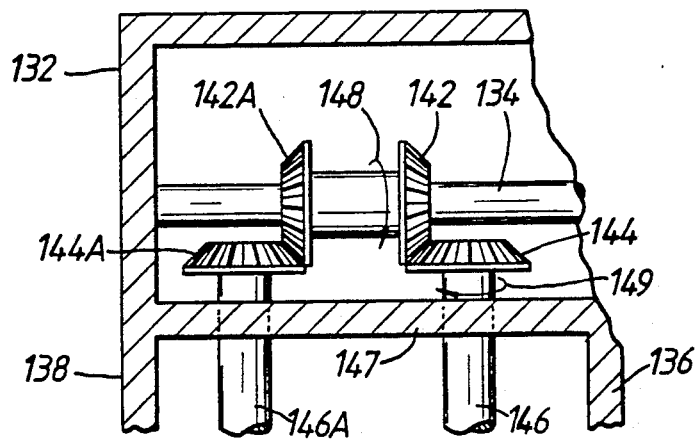
FIG. 7 is a diagrammatic partial cross-section on the line VII—VII of FIG. 6.
Figure 6:
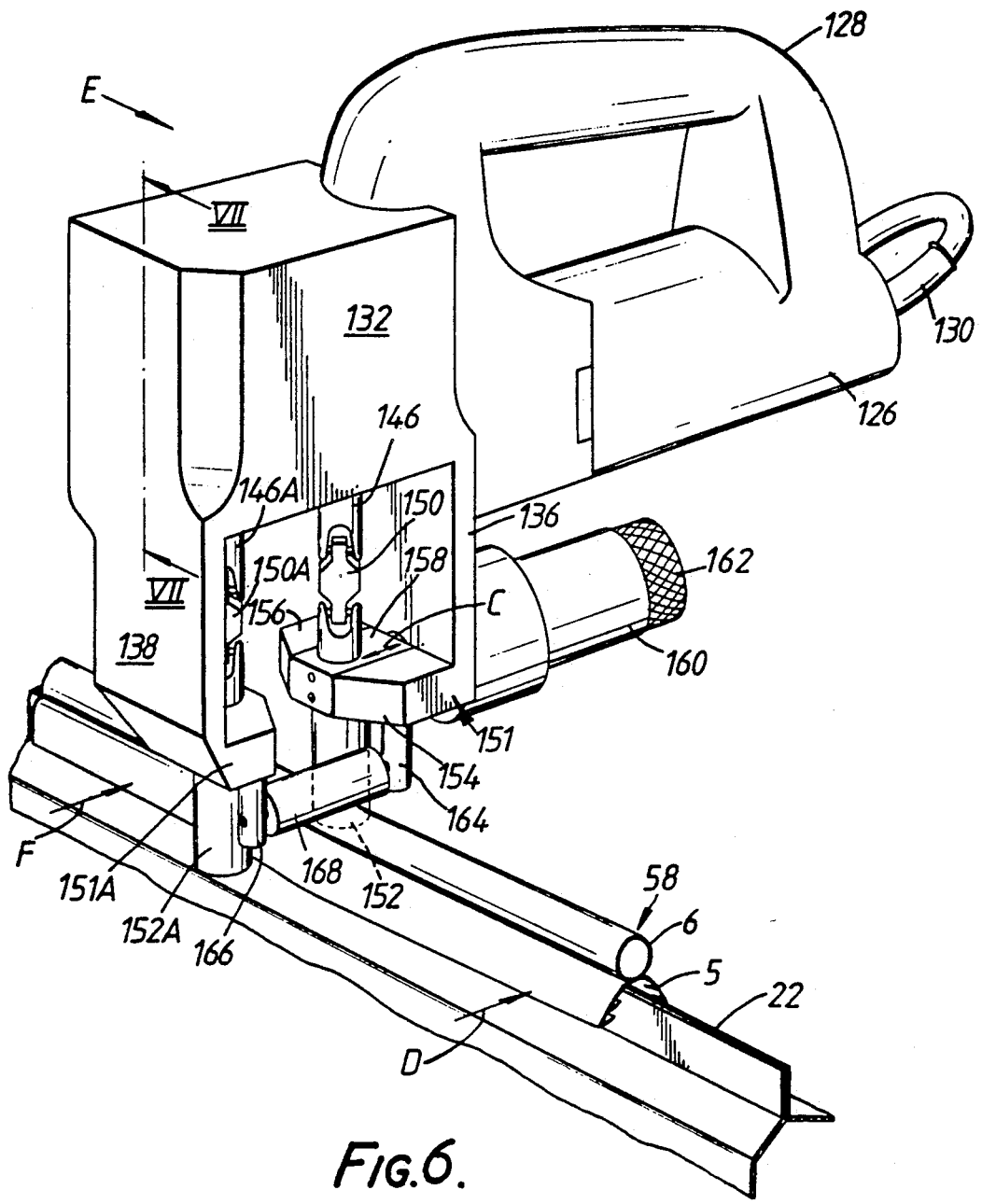
FIG. 6 is a diagrammatic perspective view illustrating a further tool embodying the invention.

As shown in FIG. 6, a further tool 125 has a body 126 and a handle 128. The body 126 houses an electric drive motor powered by means of an electric cable 130. A switch for switching the motor on and off is incorporated in the handle 128 though not illustrated. The output shaft of the motor is connected through suitable bevel gearing to a gear box 132 where it rotates a shaft 134 (see FIG. 7). Shaft 134 is supported in bearings 136 and 138 in the gearbox side walls 136 and 138 and carries bevel gears 142 and 142A which respectively drive bevel gears 144 and 144A. The latter gears are rigid with vertically arranged shafts 146 and 146A supported in bearings in the lower wall 147 of the gear box 132.

The electric motor rotates shaft 134 in the direction shown by arrow 148. This rotates shaft 146 in the direction shown by arrow 149 and shaft 146A rotates in the opposite direction.

As shown in FIG. 6, shafts 146 and 146A extend downwardly from the gearbox 132 and each incorporates a respective flexible coupling or universal joint 150, 150A (the latter being only partially visible). The shafts continue downwardly to and through bearings in shoulders 151, 151A respectively, which are carried by downwardly depending extensions of the side walls 136, 138 of the gearbox 132. Shaft 146 carries a roller 152, and shaft 146A carries a roller 152A.

Shoulder 151 is in fact in three parts: two outer parts 154 and 156 which are rigid with the downwardly depending side wall 136 which carries them and a central part 158 which is fixed vertically with respect to the outer parts 154 and 156 but is slidable relative to them in the direction of the arrow C. Advantageously, the facing side edges of the parts 154 and 156 carry keyways receiving matching keys in the sides of the central part 158 so as to constrain the latter for the sliding movement. The outside of the downwardly depending wall 136 carries a handgrip 160 through which extends a shaft (not shown) which is rotated by means of knurled knob 162. This shaft threadedly engages a matching thread formed in a bore extending part way through the central part 158 which thus acts as a nut on the shaft and moves in the direction of the arrows C as the knurled knob 162 is rotated. In this way, roller 152 can be moved towards and away from roller 152A but still maintaining its configuration in which it is vertical and parallel to the axis of roller 152A. The extent of the possible movement is such that it can be readily accommodated by the flexible coupling 148.

The outer part 154 of the shoulder 151 on the one hand and the shoulder 151A on the other carry downwardly depending supports 164 and 166 which rotatably support a horizontal roller 168.

FIG. 6 illustrates the sealing strip on the flange 22. In use, the sealing strip is placed onto the flange 22 with its side walls in the splayed apart configuration shown in FIG. 1A and as indicated at region D in FIG. 6. The tool is then placed over the sealing strip on the flange so that the rollers 152 and 152A are adjacent the outsides of the splayed apart side walls of the gripping part 5. The top roller 168 is now in contact with the sealing part 6. By means of the knurled knob 162, the operator adjusts the spacing between the rollers 152 and 152A so that the splayed apart side walls are forced into the configuration shown in FIG. 1B. With the motor energised by the operator, the tool then moves in the direction of the arrow E, being driven in this direction by the rotation of the rollers 152 and 152A. The operator guides the tool as it moves along the flange in the direction of the arrow E and, as it so moves, the side rollers force the splayed apart side walls of the gripping part 5 together into the configuration shown in FIG. 1B and into firm gripping engagement with the flange. As the tool moves along the flange, the top roller 168 temporarily flattens the sealing part 6. At region F in FIG. 6, a part of the sealing strip as finally fitted onto the flange 22 is shown.

Again, the motor can be electrically powered or powered by compressed air or by any other suitable means.

Figure 8:
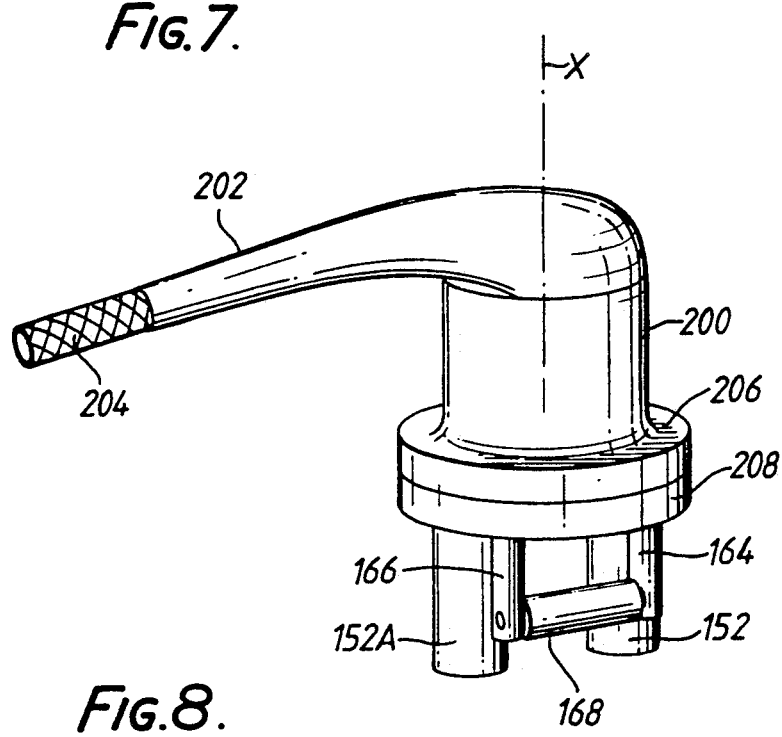
FIG. 8 is a diagrammatic perspective view of yet another tool embodying the invention.

FIG. 8 illustrates in perspective form a further possible form of the tool. In FIG. 8, the drive motor is housed in a body 200, the motor being a pneumatic motor driven by compressed air. A handle 202, by which the operator grips the tool, is integrally connected to the body 200 and the supply line 204 for the compressed air passes through the handle. Integrally attached to the motor 200 is a base 206 incorporating suitable gearing by which the rotation of the motor is transmitted to a roller support assembly 208. A housing 208 rotatably supports rollers 152 and 152A corresponding to the rollers with these reference numerals in FIG. 6. Rollers 152 and 152A are thus contra-rotated by the pneumatic motor in the housing 200. The housing 208 also carries supports 164 and 166 rotatably carrying a horizontal roller 168, these three components corresponding to the same-numbered components in FIG. 6.

In this tool, the base 206 and the housing 208 are attached together so as to be able to rotate, relative to each other, about the axis X, such rotation not affecting the contra-rotation of the rollers 152 and 152A.

The ability of the base 206 and the housing 208 to rotate relative to each other is advantageous in that it enables an operator to hold the tool at the most comfortable angle as he moves it along the mounting flange 22 (for example, see FIG. 6) around the vehicle opening to which the sealing strip is being fitted. Thus, for example, as the tool is driven along the sealing strip on the flange by the contra-rotating rollers 152 and 152A, the housing 208 can rotate relative to the base 206 as the tool travels around a corner or bend in the flange and there is no need for the operator to alter the angle at which he is holding the handle 202.

Such an arrangement is also advantageous if the tool is held by a robot, instead of a human operator, and moved around the flange by the robot.

In the tool of FIG. 8, the spacing between the rollers 152 and 152A is not adjustable—unlike the tool shown in FIG. 6. However, it is a simple matter to remove the housing 208, together with all the rollers, and then replace it with a similar unit but with differently spaced rollers 152 and 152A.

In certain circumstances, a flange around a vehicle opening may run immediately adjacent other protruding body parts or fixtures, such as parts of lock assemblies on vehicle doors. In order to eliminate the possibility of such fixtures interfering with the free movement of the tool (in any of the forms described) around the flange, the tool may be suitable shaped to avoid this. For example, its handle or the motor housing or some other part may be suitably inclined or offset from the attitude shown in the Figures. It may be necessary to match a tool in this way to suit a particular vehicle body design.

What is claimed is:

1. Portable apparatus for installing a channel-shaped sealing or finishing strip on a mounting flange or the like running around an opening closable by a closure member, the sealing strip being generally channel-shaped in cross-section but with the side walls of the channel initially splayed apart to facilitate mounting on the mounting flange, comprising:
   a support movable relative to the strip when the strip is in position on the mounting flange,
   pressure-applying means carried by the support along the strip for applying, to the external surfaces of the side walls of the channel, pressure which closes the side walls of the channel towards each other,
   the pressure-applying means comprising a first roller rotatably mounted on the support and applying the said pressure to one of the side walls of the channel and a second roller rotatably mounted on the support and bearing against the outside of the base of the channel and having a thin flange rotating therewith, said thin flange having a first surface which applies the said pressure to the other side wall of the channel and a second surface opposite to the first surface and clear of any part of the apparatus.

2. Apparatus according to claim 1, in which the roller bears indirectly against the said one of the side walls via a seal carried by this side wall.

3. Apparatus according to claim 1, in which the rollers are rotatably linked together.

4. Apparatus according to claim 1, including drive means on the support for driving at least one of the rollers.

5. Apparatus according to claim 4, in which the drive means on the one hand and the rollers on the other are angularly movable relative to each other about an axis other than the axes of rotation of the rollers.

6. Apparatus according to claim 1, including means on the support for maintaining the said pressure substantially constant in spite of variations in thickness of the mounting flange.

7. Apparatus according to claim 1, including a handle attached to the support.

8. Apparatus according to claim 7, in which the handle is angularly movable relative to the support.

9. A portable tool for installing a channel-shaped sealing or finishing strip on a mounting flange or the like running around an opening closable by a closure member, the strip being generally channel-shaped in cross-section but with the side walls of the channel initially splayed apart to facilitate mounting, comprising:
   a support movable relative to the strip when mounted on the flange,
   a pair of rollers mounted for rotation on the support about parallel axes,
   motor means connected to drive the rollers of the said pair of rollers mechanically in opposite directions, the rollers of the said pair of rollers being mounted with their peripheries spaced apart to define a gap of such predetermined distance as to enable them to apply pressure to the splayed-apart side walls of the channel of the strip so as to close the splayed-apart side walls towards each other as the support is driven along the length of the strip on the flange by frictional contact between the strip and the rotating rollers, whereby the side walls of the strip move into a subsequently retained configuration in which they embracingly grip the flange,
   a third roller mounted on the support to be rotatable about an axis which is perpendicular to the parallel axes of the said pair of rollers, the third roller being mounted so as to extend across the gap between the said pair of rollers and to be so positioned in relation to the pair of rollers that it applies pressure to the outside of the base of the channel when the strip is mounted on the flange, the third roller being undriven and free-running and positioned forward of the said pair of rollers in the direction of movement of the support.

10. A tool according to claim 9, in which rollers of the said pair of rollers are linked together for rotation together.

11. A tool according to claim 9, in which the rollers of the said pair of rollers are linked together through a differential mechanism.

12. A tool according to claim 9, including a handle connected to the support.

13. A tool movable to claim 12, in which the handle is angularly movable relative to the support.

14. A tool according to claim 9, including a handle connected to the support, and in which the motor means drives the rollers of the said pair of rollers through the intermediary of a shaft passing through the handle.

15. A tool according to claim 9, in which the support is a housing for the tool.

16. A tool according to claim 9, including means carried by the tool for supporting and guiding a length of the said strip, with its said side walls in the initially splayed apart configuration, from a supply thereof onto the flange.

17. A portable tool for installing a channel-shaped sealing or finishing strip on
   a mounting flange or the like, the strip having a generally channel-shaped cross-section but with the side walls of the channel initially spayed apart to facilitate mounting on the flange, comprising
   a support movable relative to the strip when the strip is mounted on the flange,
   force-applying means for applying to the external surfaces of the side walls of the channel, force which closes the side walls of the channel towards each other,
   the force-applying means comprising first and second rollers mounted on the support to be rotatable about parallel axes which are spaced apart by an adjustable distance and which respectively engage the said external surfaces,
   adjusting means on the support for adjusting the said adjustable distance and maintaining the axes of the rollers parallel during said adjustment, and
   drive means on the support for driving the rollers in opposite directions.

18. A tool according to claim 17, including a further roller rotatably mounted on the support to make contact with the strip and to apply force to the base of the said channel to assist in holding the strip on the flange.

19. A tool according to claim 17, in which the drive means comprises means supporting first and second shafts for rotation in opposite directions about parallel axes having a fixed distance between them, the first shaft having an extension connected to the first roller for rotating it about its said axis, the latter axis being fixed in relation to the axis of the first shaft, the second shaft having an extension connected to the second roller for rotating it about its respective axis, the second roller being mounted by means of the said adjusting means so that its axis is movable towards and away from the axis of the first roller to vary the said adjustable distance, the extension of the second shaft incorporating flexible coupling means permitting the axis of the second roller to move relative to the axis of the second shaft.

* * * * *